United States Patent [19]

Joubert

[11] Patent Number: 4,508,270

[45] Date of Patent: Apr. 2, 1985

[54] APPARATUS FOR ROLLING AND GUIDING A DIRECTABLE JET NOZZLE

[75] Inventor: Raymond J. M. Joubert, Savigny sur Orge, France

[73] Assignee: S.N.E.C.M.A., Paris, France

[21] Appl. No.: 357,766

[22] Filed: Mar. 12, 1982

[30] Foreign Application Priority Data

Mar. 13, 1981 [FR] France ............................. 81 05460

[51] Int. Cl.³ ............................................. B64C 15/00
[52] U.S. Cl. ............................................... 239/265.35
[58] Field of Search ...................... 239/265.35, 265.11, 239/308; 60/232

[56] References Cited

U.S. PATENT DOCUMENTS

| 2,193,375 | 3/1940 | Papritz | 239/265.35 |
| 3,016,697 | 1/1962 | Sternberg et al. | 60/35.6 |
| 3,147,591 | 9/1964 | McEwen | 60/35.55 |
| 3,912,172 | 10/1975 | Bolner | 239/265.35 |
| 4,047,667 | 9/1977 | McCullough et al. | 239/265.35 |
| 4,108,381 | 8/1978 | Sottosanti et al. | 239/265.35 |
| 4,363,445 | 12/1982 | Bouiller et al. | 239/265.35 |

FOREIGN PATENT DOCUMENTS

| 2719439 | 11/1978 | Fed. Rep. of Germany . | |
| 1025827 | 4/1953 | France | 239/265.35 |
| 76840 | 10/1961 | France . | |
| 2470253 | 5/1981 | France . | |
| 722338 | 1/1955 | United Kingdom | 239/265.35 |
| 1291586 | 10/1972 | United Kingdom | 239/265.35 |
| 7935470 | 10/1979 | United Kingdom | 239/265.35 |
| 8036767 | 6/1981 | United Kingdom | 239/265.35 |

Primary Examiner—John J. Love
Assistant Examiner—Jon M. Rastello
Attorney, Agent, or Firm—Oblon, Fisher, Spivak, McClelland & Maier

[57] ABSTRACT

The directable nozzle comprises a fixed part bearing at its extremity a fixed interior spherical sliding surface against which an exterior movable spherical race of a cylindrical collar comprising the movable part of the nozzle can displace itself. This race is attached to a movable exterior structure activated by a control device. The sealing structure is attached between the fixed interior spherical race and the movable exterior spherical race. The rolling and guiding apparatus comprises a fixed exterior spherical race coaxial with the fixed interior spherical race, rolling devices disposed between the fixed exterior spherical race and the movable exterior spherical race and guiding structure disposed between the movable exterior structure and the fixed part of the nozzle.

17 Claims, 7 Drawing Figures

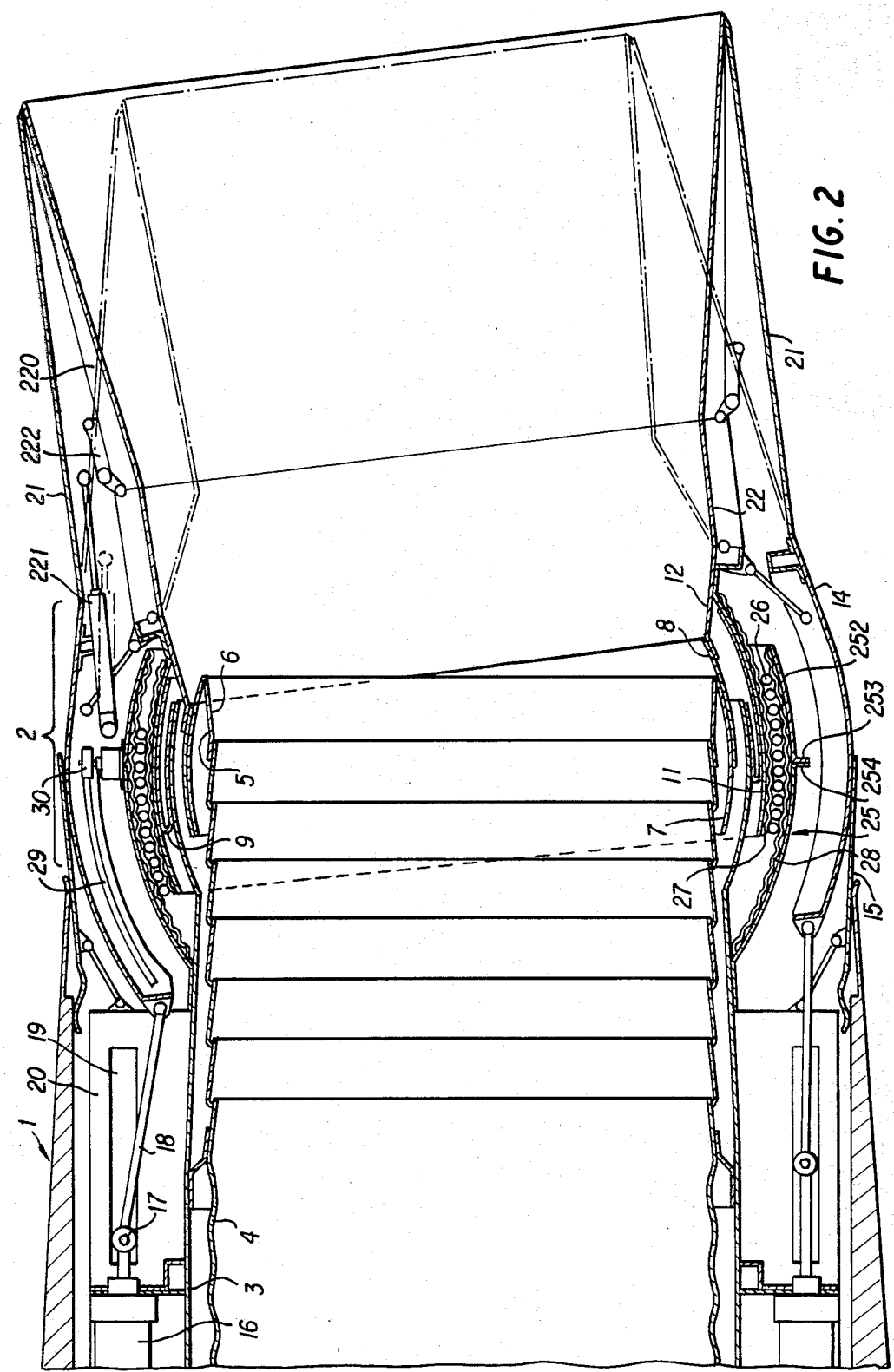

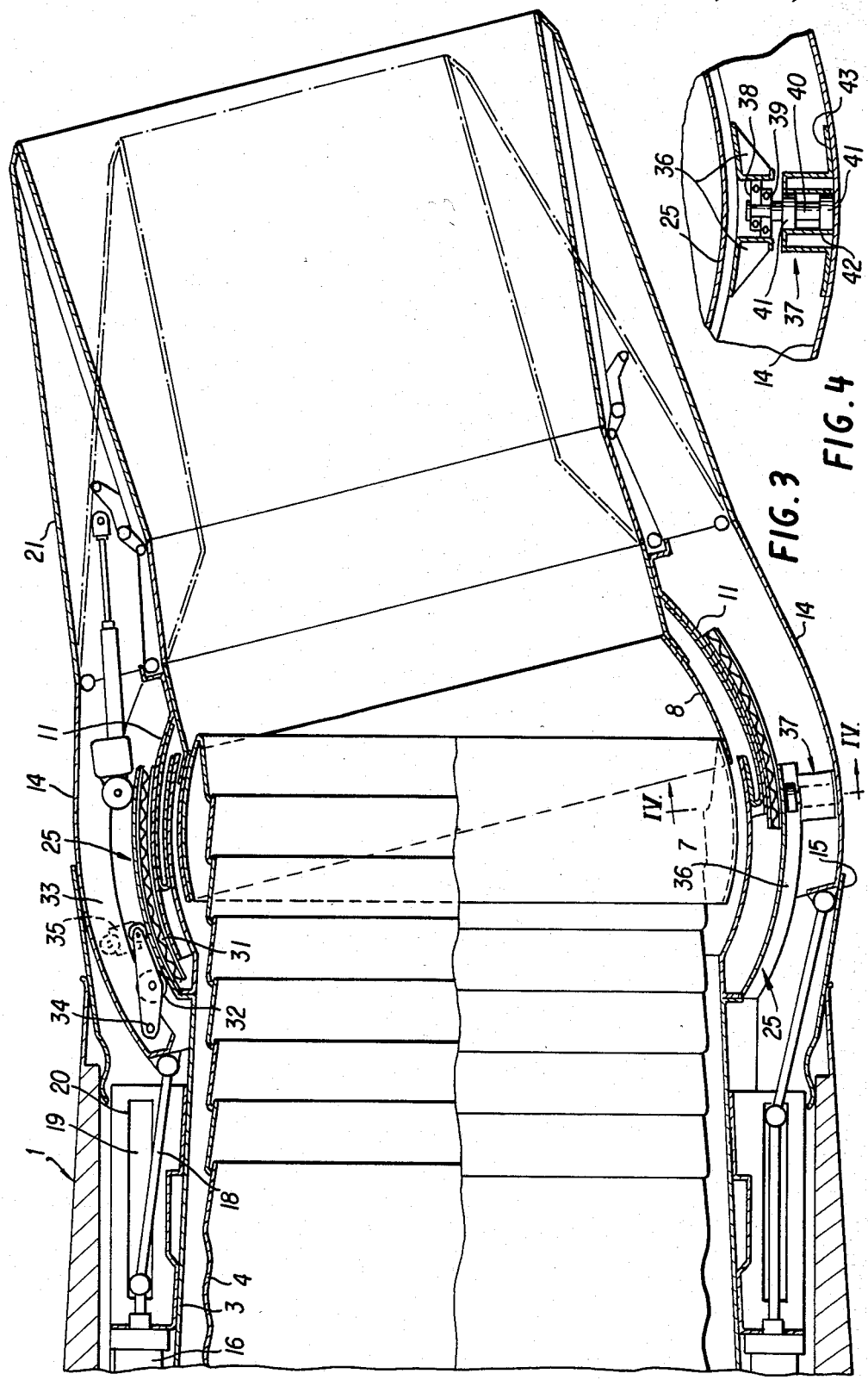

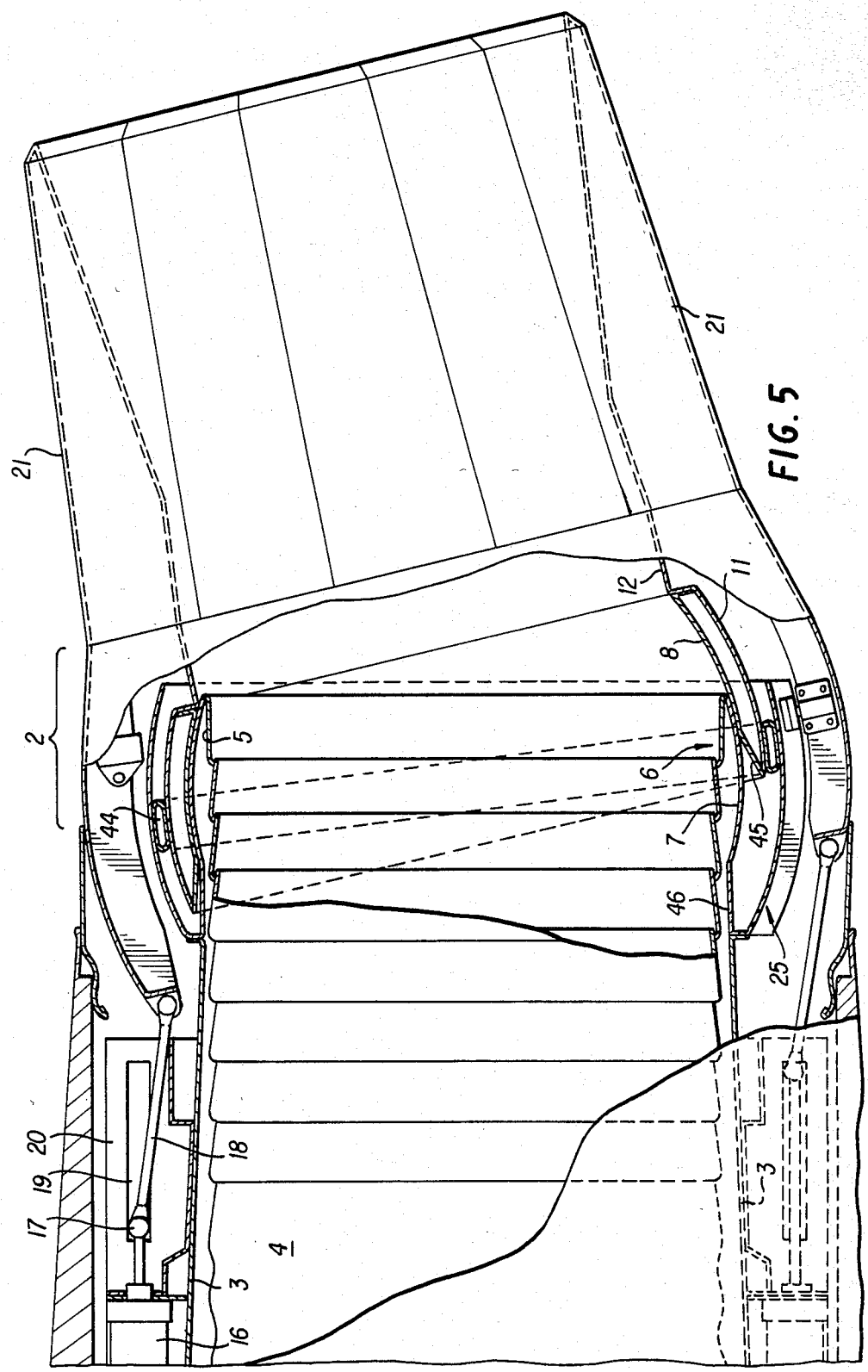

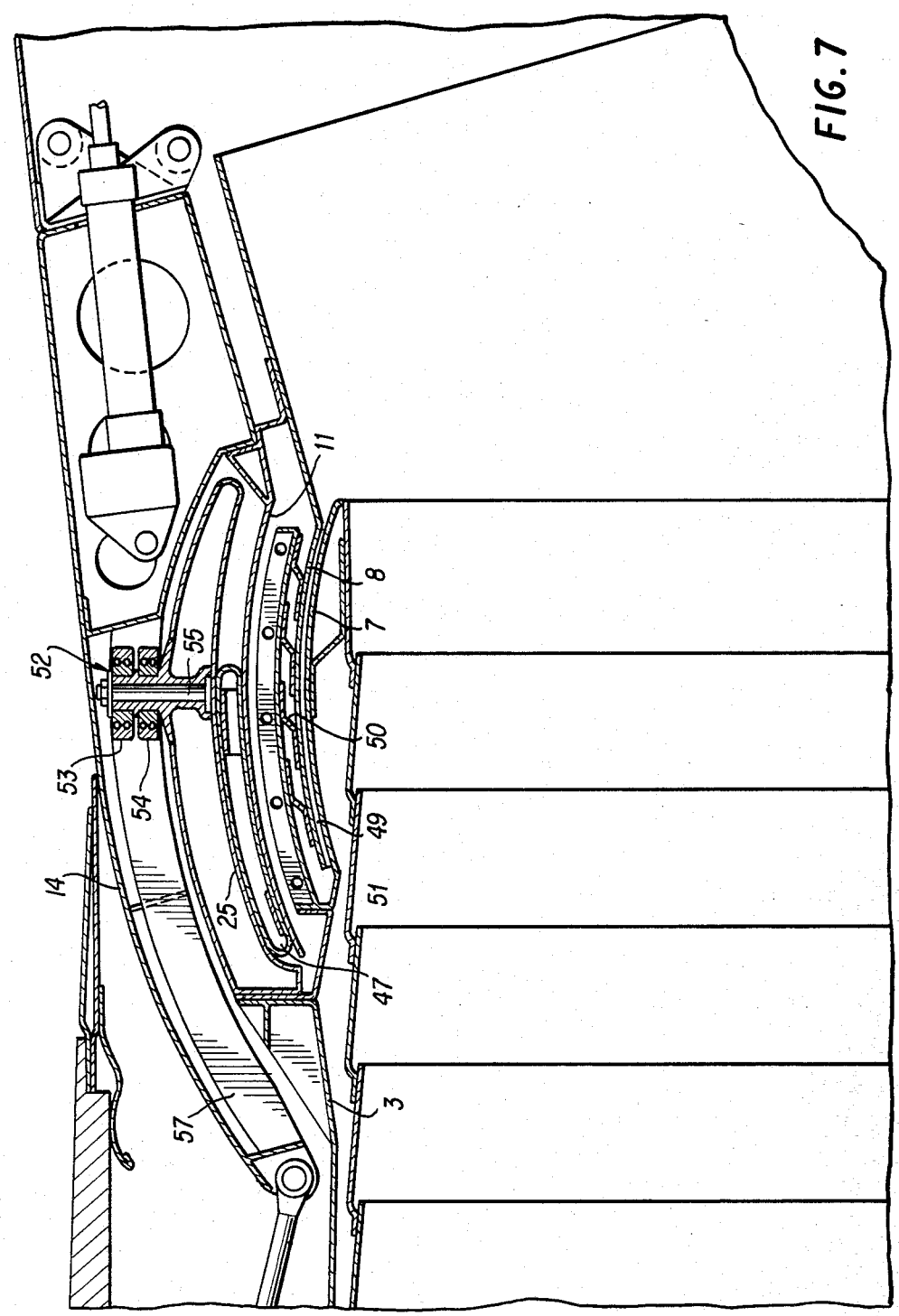

APPARATUS FOR ROLLING AND GUIDING A DIRECTABLE JET NOZZLE

BACKGROUND OF THE INVENTION

1. Field of the Invention

The invention relates to an apparatus for rolling and guiding a directable jet nozzle in which a fixed part of the nozzle has at its posterior extremity a spherical race. A spherical race of a sleeve, constituting the movable race of the nozzle, is capable of displacement against the spherical race of the fixed part of the nozzle. Sealing means are provided between the two spherical races.

2. Description of the Prior Art

Modern military aircraft require activating means to change their attitude which, unlike aerodynamic controls, do not involve a concomitant increase in drag. This requirement has led to the use of directable jet nozzle reactors which make it possible to achieve, depending on the chosen deviation component, a rapid attitude modification. Among the known types of directable nozzles, those with a spherical articulation allow orientation in all directions, are less bulky, and are simpler to produce. Applicants' French application Ser. No. 79.29208 filed Nov. 23, 1979 describes a directable jet nozzle with a spherical articulation having a movable part consisting of a cylindrical jet deviation sleeve extended by two coaxial spherical interior and exterior sliding surfaces, and a fixed part formed by the extremity of the ejection duct extended by a spherical surface. The interior spherical sliding surface of the movable part works together with a spherical surface supported at the extremity of the thermal protection jacket and assures the sealing of the flow of ejected gas. The exterior spherical sliding surface of the movable part shifts along the spherical sliding surface of the fixed part thereby engaging the extremity of a sealing membrane whose other extremity is attached to the fixed spherical sliding surface.

The spherical sliding surfaces are thin pieces made by metal forming whose dimensional variations due to manufacturing tolerances are relatively important. Furthermore, these thin metal pieces are subjected to vibrations which limit their useful life.

SUMMARY OF THE INVENTION

The object of the invention is to diminish or otherwise suppress these vibrations and to achieve improved force distribution due to the dynamic pressure of the flow deflected by the moving part.

The apparatus of the invention makes it possible to increase the rigidity of the sliding surfaces and to absorb part of the force born by the moving part, the other part being taken over by the system of jacks which orient the blast pipe.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 2 is an axial section through a rotating thrust-vectoring nozzle according to a second embodiment;

FIG. 3 is an axial section of a third embodiment;

FIG. 4 is a view along IV—IV in FIG. 3 showing an embodiment of the guidance structure;

FIG. 5 is an axial section of a fourth embodiment;

FIG. 7 is a view along VII in FIG. 6.

DETAILED DESCRIPTION OF THE PREFERRED EMBODIMENTS

In the following description, identical elements have the same references throughout the views. The drawings show the nozzles pointing up.

Figure 1:
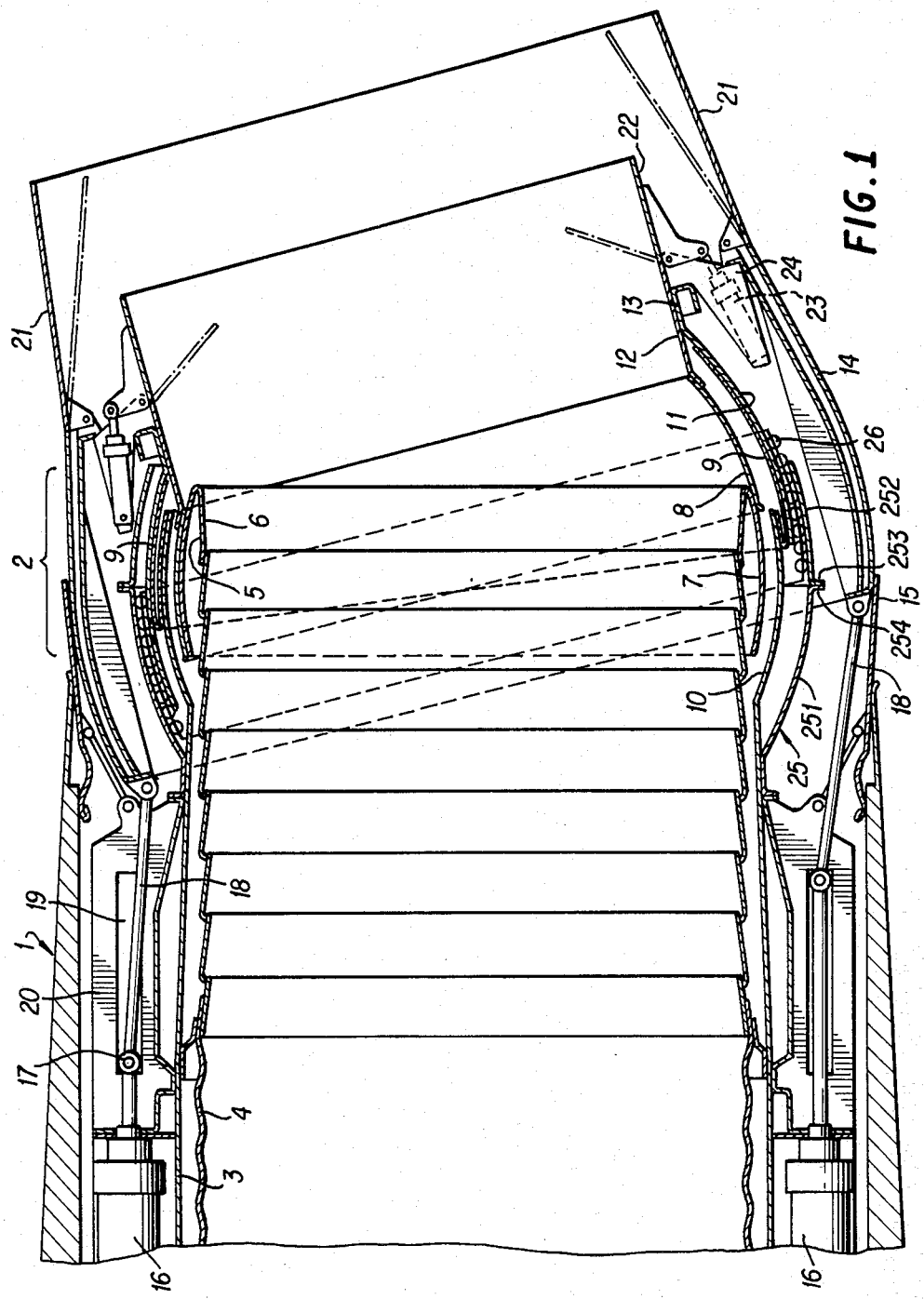
FIG. 1 is an axial section through a rotating thrust-vectoring nozzle comprising a first embodiment of the apparatus according to the invention.

In FIG. 1, a rotatable thrust-vectoring nozzle 2 is attached to the extremity of a fuselage or an aircraft pod 1. The afterburner duct 3, or discharge duct, is of double wall construction provided by the thermal protection jacket 4 which ends in a cylindrical sliding surface 5. On the internal surface slides, due to the pressure of refrigeration gas circulating between duct 3 and jacket 4, a cylindrical element 6 that is fixed to the interior surface of a spherical sleeve 7 forming a hollow spherical collar. The exterior surface of the sleeve 7 cooperates with a spherical sliding surface 8 attached to the movable part of the nozzle. The function of the hollow spherical collar is to prevent the refrigeration gases between duct 3 and jacket 4 from escaping into the ejection gas stream, and to conduct the refrigeration gases between the sleeve 7 and a sealing membrane 9 in order to assure the cooling of the sealing membrane 9.

The lower extremity of the duct 3 is extended by a spherical sliding surface 10.

The movable part of the nozzle consists of a cylindrical sleeve 12 supporting upstream the interior spherical sliding surface 8 and an exterior spherical race 11. The exterior race 11 coaxially covers the interior sliding surface 8 and at least a part of the cylindrical sleeve 12. The interior sliding surface 8 slides against the hollow spherical collar 7 to assure sealing between the refrigeration gases and the thrust stream. The exterior race 11 supports the sealing membrane 9, which is attached by one of its edges to the part of the race 11 close to the cylindrical sleeve 12 and by its other edge to the free edge of the spherical sliding surface 10 of the duct 3. According to the embodiment of FIG. 1, the exterior spherical sleeve 11 is born by a sleeve 13 attached to the cylindrical sleeve 12.

The movable part of the nozzle is supported by an exterior spherical structure 14 whose rotation is controlled by a system of jacks. The seal between the exterior spherical structure 14 and the fuselage or pod is assured by a ring of elastic flaps 15 which bear against the exterior spherical structure.

The jacks 16 controlling the rotation of the nozzle have bodies fixed between the channel 3 and the fuselage or pod 1. The connecting rods 18 are articulated to supports 17 which are solidly attached to one extremity of the jack rods and which slide in guides 19 of a support piece 20. The other extremities of the connecting rods 18 are articulated to the exterior spherical structure 14. The jacks 16 can be of any type such as hydraulic, pneumatic, screw, etc. and act by pulling or pressing.

The exterior spherical structure 14 supports at its lower extremity the exterior flaps 21 of a nozzle modification apparatus of the terminal section of the rear body. The flaps 21 are activated by means of a rod (not shown) articulated to the interior flaps 22, the flaps 22 providing a variable section and being regulated by the jacks 23 attached between the exterior spherical structure 14 and the flaps 22. The connection between the mobile part of the nozzle and the exterior spherical structure is accomplished at least in part by the supports 24 of the jacks 23 which are solidly attached to the sleeve 13 and the downstream extremity of the exterior structure 14.

The elements described hereinabove are already known from the previously cited patent. The apparatus according to the invention resides, in part, in rolling devices which work together with the surfaces facing the two spherical races, one surface being appurtenant to the fixed part and the other to the movable part of the directable nozzle.

According to the embodiments shown in FIGS. 1, 2 and 3 in which the cylindrical sleeve of the downstream extremity of the duct 3 bears a hollow spherical collar 10, there is a second exterior spherical race 25 provided on the fixed part. The rolling devices 26 are thus placed between the exterior spherical race 11 of the movable part and the exterior spherical race 25 of the fixed part.

In the example of FIG. 1, the rolling devices 26 are made up of bearings held in a cage formed by two spherical rings of stainless steel foil comprising sockets disposed in staggered rows in which the bearings are lodged. The rings are united by known fixation devices such as rivets, solder, pins, etc. To allow the bearing rings 26 to be put in place, the exterior spherical race 25 of the fixed part is formed of two parts 251 and 252. Removable part 252 is attached by bolts at its flange 253, to the flange 254 of part 251.

The rolling devices permit the transmission of forces applied by the exterior race 11 of the movable part to the fixed part by way of the race 25 which can be provided with reinforcements on its exterior wall.

Because of the flexibility of the articulation due to the rolling devices, guidance structure is provided that is not shown in FIG. 1, and which will be subsequently described. The guidance structure prevents all axial rotation of the movable part at the time when the direction of the jet changes.

FIG. 2 shows a second embodiment of the invention in which the bearing ring 26 is held between two flexible socketed fittings 27 and 28 attached to the fixed spherical race 25 and movable spherical race 11. The sockets are distributed in staggered rows on the internal and external faces of the races. These elements are designed to suppress vibrations and to absorb the dimensional variations due to manufacturing tolerances of the cast hollow ware assemblies.

The guidance structure for the movable part of the nozzle comprises a ramp 29 secured in the interior of the exterior spherical structure 14 of the movable part of the jet and a roller 30 attached by its axis to the exterior surface of the exterior spherical race 25 of the fixed part.

The directable nozzle shown in FIG. 2 is a divergent-convergent nozzle. The cylindrical sleeve 12 is extended by a nozzle area modification apparatus 220 for the ejection section of the nozzle. This apparatus 220, fixed to the exterior movable structure 14 as far as the displacement of its axis is concerned, can produce a divergent-convergent profile as shown in broken lines. The nozzle area modification is achieved, as already described in French application Ser. No. 79.29208 filed Nov. 23, 1979 in the classic manner with the aid of the jacks 221 and rods 222.

FIG. 3 shows a third embodiment of the apparatus in which the rolling devices are made up of a spherical fitting 31 formed of a material of the NORSIAL type in a flat sheet onto which an undulant plate is fixed.

The material is, for example, attached to the external spherical race 11 of the movable part. The apex of he undulations, which work together with the external spherical race 25 of the fixed part, are formed concentrically on the spherical race 11. The apex of the undulations are covered by a material with a low friction coefficient, for example carbon or a composite heat-resistant material. The pressure device 32 bears on the external face of the fixed external spherical race 25, which is made up of sphere portions assembled contiguously or overlapping. The pressure device is made up of rolling organs, for example rollers mounted on the articulated lever 33 mounted at 34 to the exterior structure 14 of the movable part of the nozzle. The pressure of the roller on the race is determined by an elastic organ 35 attached between the structure 14 and the extremity of the lever 33 supporting the roller 32. This organ 35 also acts as a damping device. The rollers are evenly distributed along the periphery of the fixed race 25.

The above apparatus assembly assures the absorption of a part of the force exerted on the nozzle, the other part of the force being absorbed by the action of the jack 16.

In accordance with the illustrated embodiment, the apparatus also comprises guidance structure, inserted between the rollers, which are shown in the lower part of the drawing and form an assembly comprising a slide 36 (FIG. 4) attached to the exterior spherical race 25 of the fixed part and a double action roller 37 attached in the external structure 14 of the movable part. The double action roller 37 is made up of two eccentric ball bearings 38 and 39, mounted on an axle 40, the same being maintained by means of two bearing races 41 in bearing 42 attached by flanges 43 to the internal part of the external structure 14 of the movable part of the nozzle.

The guidance structure for the apparatus described above is similar to that of the apparatus according to the first and second embodiments with the exception that the roller elements and slides are inverted relative to the race 25 of the fixed part and the structure 14 of the movable part.

FIG. 5 shows a fourth embodiment in which the rolling devices are made up of a flexible silicon ring 44, sealed and guarded against variations in the load which it supports, a section having the same profile in the axial plane on all of its peripheral area, thus making it possible to maintain permanent centering of the movable part on the fixed part. The ring 44 is attached to the extremity of the exterior race 11 of the movable part. Due to the very good seal of the ring 44, it is possible to eliminate the sealing membrane 9 of the preceding embodiments. Additional modifications made in relation to the directable nozzle described above are the following:

1. The interior spherical sliding surface 8 and exterior race 11 of the movable part are united at their free extremity by a conical collar 45 which provides a seal between the two elements.
2. The spherical collar 7 attached to the cylindrical ring 6 is connected at its extremity to the duct 3 by a cylindrical ring 46 and thus replaces the interior spherical sliding surface 10 of the fixed part. FIGS.

Figure 6:
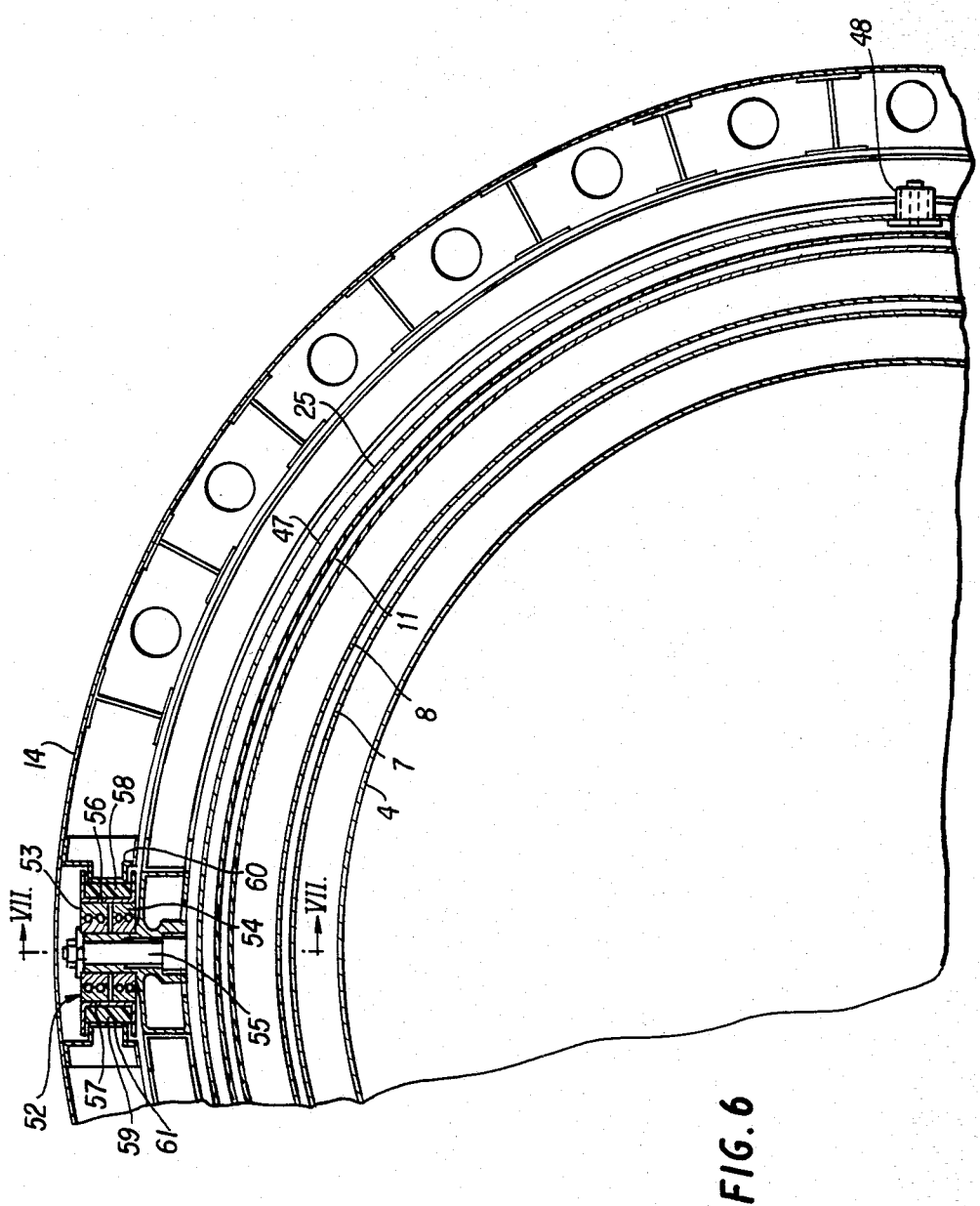
FIG. 6 is a partial transverse section of a fifth embodiment.

6 and 7 show a fifth embodiment in which the rolling devices comprise a deformable ring 47 which is attached to the exterior spherical race 11 of the movable part. This ring is made up of a closed supple membrane enclosing a sealed volume occupying a significant part of the width of the race, and placed under pressure with the aid of a valve 48 (FIG. 6).

The ring 47 plays the same role as the ring 44 in the preceding example, i.e. to assure that a portion of the force of the movable part on the fixed part of the nozzle is absorbed and to assure a seal between the gas stream and the cooling gas. As in the other examples, there is also a second sealing stage between the interior spherical sliding surface 7 of the fixed part and that of the movable part, formed by a friction material 49 such as a honeycomb. In order to improve the contact and, consequently, the seal between the honeycomb and the movable spherical sliding surface, there is provided on the opposing face of the sliding surface 8 elastic organs 50 having S profiles, the organs 50 being affixed to the periphery of the movable race in coaxial circles. The organs 50 may advantageously be of a known type, for example with longitudinal slits and being overlapping.

The extremity of the strips supports and rubs against a spherical part 51 united with the support of the fixed race 25.

According to another embodiment of the guidance structure, such structure comprises three rollers 52 solidly attached to the fixed part of the channel. The axes of two of the rollers are diametrically opposed relative to the channel, while the axis of the third is perpendicular to the other two and disposed at the apex of an isosceles triangle whose base passes through the other two. The movable part of the nozzle thus turns around the two perpendicular axes, converging with the center of rotation. In operation, the geometric locus of the movable locus of the movable nozzle axis for a value of maximum angular displacement is constituted by a cone of 30° whose apex is located on the center of rotation. This value of 30° is comparable to the displacement values of the other embodiments previously described.

The rollers are made up, as in the other embodiments, of two ball bearings 53 and 54 which turn around a solid axle 55 of the fixed part 25 of the ejection channel. The rollers are in constant contact with a slide formed by two rolling bands 56 and 57 supported by two elastic organs 58 and 59 acting as dampers.

The guidance structure, consisting of three assemblies: rollers, rolling bands and elastic organs, are disposed in the exterior structure 14 of the movable part such that they connect with the supports 60 and 61.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rolling and guiding apparatus for a directable jet propulsion nozzle, comprising:
   a fixed part of said nozzle;
   a cylindrical movable part of said nozzle movable with respect to said fixed part;
   an exterior spherical structure fixed to said movable part of said nozzle;
   control means connected between said fixed part and said exterior movable structure for activating the movement of said exterior movable structure;
   guidance means disposed between said fixed part and said exterior movable structure for guiding the movement of said exterior movable structure;
   a fixed interior spherical race fixed to an end of said fixed part of said nozzle;
   a movable exterior spherical race fixed to said cylindrical movable part, said movable spherical race being concentric with, and exterior to, said interior fixed spherical race, said fixed interior race and said movable exterior race being spaced from one another such that said movable exterior race is not supported by said fixed interior race;
   sealing means fixed between said interior fixed and said movable spherical races; and
   means for transmitting jet propulsion-generated loads from said cylindrical movable part of said nozzle to said fixed part of said nozzle, said means for transmitting comprising a fixed exterior spherical race fixed to said fixed part of said nozzle and extending coaxial with said fixed interior spherical race and exterior of said movable exterior spherical race, said means for transmitting further comprising rolling bearing means disposed between said fixed exterior spherical race and said movable exterior spherical race, said movable exterior race being supported by said fixed exterior race.

2. The apparatus of claim 1, wherein said rolling means are disposed between flexible socketed fittings attached to both said fixed exterior spherical race and to said movable exterior spherical race.

3. The apparatus of claim 1, wherein said rolling means comprise at least one fitting attached to one of said fixed and movable exterior spherical races.

4. The apparatus of claim 3, wherein said fitting is formed by an undulant metallic material.

5. The apparatus of claim 3 or 4 wherein the other said exterior spherical race bears a coating of a material with a low friction coefficient.

6. The apparatus of claim 3 or 4 including pressure means disposed between said exterior movable structure and said fixed exterior spherical race.

7. The apparatus of claim 6 wherein said pressure means comprises rolling organs mounted to levers articulated between said exterior movable structure and an elastic organ attached to said exterior movable structure.

8. The apparatus of claim 1 wherein said rolling means comprise a flexible ring sealingly attached to one of said fixed and movable exterior spherical races.

9. The apparatus of claim 8 wherein said ring includes a valve for pressurization.

10. The apparatus of claim 8 or 9 wherein said ring comprises at least one part of said sealing means.

11. The apparatus of claim 10 including an interior movable spherical race, wherein another part of said sealing means is formed by a collar sealingly joining the distal ends of said interior and exterior movable spherical races.

12. The apparatus of claim 10 including a movable interior spherical race, wherein the other part of said tightening means is formed by elastic organs attached around the periphery of said movable interior spherical race.

13. The apparatus of claim 12 wherein said elastic organs comprise at least one portion of S-shaped extruded structural pieces, or of portions of S-shapes.

14. The apparatus of claim 1 wherein said guidance means comprise at least one guidance assembly formed by a slide attached to one of the fixed exterior spherical race and the movable exterior structure, and a roller attached to the other fixed interior spherical race and the movable exterior structure.

15. The apparatus of claim 1 wherein said guidance means comprises three guidance roller assemblies, the axes of two said rollers being diametrically opposed to the axis of said nozzle, the axis of the third said roller being perpendicular to the other two axes and disposed at the apex of an isosceles triangle whose base passes through the other two axes.

16. The apparatus of claim 15 including a slide for guiding each of said roller assemblies, each said slide comprising two rolling bands supported by elastic elements.

17. The apparatus of claim 16, wherein said roller comprises two ball bearing rollers eccentrically supported by the extremity of one axis held in a bearing by two ball bearing races.

* * * * *